US009827519B2

United States Patent
Choi et al.

(10) Patent No.: US 9,827,519 B2
(45) Date of Patent: Nov. 28, 2017

(54) METHOD OF MANUFACTURING FILTER PIPE FOR VEHICLE AND FILTER PIPE FOR VEHICLE

(71) Applicant: WOOSHIN INDUSTRIAL CO., LTD., Dangjin-si, Chungcheongnam-do (KR)

(72) Inventors: Jung-Song Choi, Gunpo-si (KR); Yong-Soo Jang, Suwon-si (KR); Jung-Hwan Kim, Hwaseong-si (KR)

(73) Assignee: WOOSHIN INDUSTRIAL CO., LTD., Dangjin-si, Chungcheongnam-do (KR)

( * ) Notice: Subject to any disclaimer, the term of this patent is extended or adjusted under 35 U.S.C. 154(b) by 60 days.

(21) Appl. No.: 14/869,534

(22) Filed: Sep. 29, 2015

(65) Prior Publication Data

US 2016/0089623 A1 Mar. 31, 2016

(30) Foreign Application Priority Data

Sep. 30, 2014 (KR) ........................ 10-2014-0131560

(51) Int. Cl.
*B01D 46/00* (2006.01)
*B01D 46/24* (2006.01)
(Continued)

(52) U.S. Cl.
CPC ..... *B01D 46/0001* (2013.01); *B01D 46/2403* (2013.01); *B21C 37/0815* (2013.01);
(Continued)

(58) Field of Classification Search
CPC .. B01D 29/035; B01D 46/2414; B65D 47/06; B67D 3/00; F01N 1/04; F01N 1/08; F01N 7/18
(Continued)

(56) References Cited

U.S. PATENT DOCUMENTS 4,464,260 A * 8/1984 Duneau ................ B01D 29/035
210/232
4,597,513 A * 7/1986 Schiemann ............ B65D 47/06
222/478
(Continued)

FOREIGN PATENT DOCUMENTS

JP 6-241016 * 8/1994 ............... F01N 1/04
KR 20010055750 * 7/2001 ............... F01N 1/08
(Continued)

*Primary Examiner* — Duane Smith
*Assistant Examiner* — Minh-Chau Pham
(74) *Attorney, Agent, or Firm* — Rabin & Berdo, P.C.

(57) ABSTRACT

A method of manufacturing a filter pipe for vehicles which has an expanded tube portion with a different diameter at one side and is provided with a plurality of through holes formed along a circumferential direction includes: forming the plurality of through holes in a mother member; forming furrows at one end portion of the mother member; forming a planar member having the plurality of through holes and the furrows by a shearing process of the mother member; bending the planar member in a tubular shape and spreading the furrows to form an area where the furrows are formed in an expanded tube shape; and adhering both facing end portions of the planar member so as to form a body having the expanded tube portion at one side thereof.

7 Claims, 8 Drawing Sheets (51) Int. Cl.
*F01N 3/021* (2006.01)
*B21D 5/01* (2006.01)
*B21D 53/88* (2006.01)
*B21C 37/08* (2006.01)
*B21C 37/15* (2006.01)
*B21C 37/16* (2006.01)
*B21D 41/02* (2006.01)

(52) U.S. Cl.
CPC ............ *B21C 37/158* (2013.01); *B21C 37/16* (2013.01); *B21D 5/015* (2013.01); *B21D 53/88* (2013.01); *F01N 3/021* (2013.01); *B01D 2279/30* (2013.01); *B21D 41/02* (2013.01)

(58) Field of Classification Search
USPC ....... 55/385.3, DIG. 28, DIG. 30; 29/890.01, 29/458; 95/273; 222/478, 568, 479, 566
See application file for complete search history.

(56) References Cited

U.S. PATENT DOCUMENTS

| | | | | |
|---|---|---|---|---|
| 5,233,755 | A * | 8/1993 | Vandendriessche | F02K 9/64 |
| | | | | 29/890.01 |
| 6,049,963 | A * | 4/2000 | Boe ......................... | G06F 1/184 |
| | | | | 24/563 |
| 8,881,395 | B2 * | 11/2014 | Dessoly .................. | F01D 5/066 |
| | | | | 29/458 |
| 2014/0260982 | A1 * | 9/2014 | Williams ........... | B01D 46/2414 |
| | | | | 95/273 |

FOREIGN PATENT DOCUMENTS

| | | | | |
|---|---|---|---|---|
| KR | 10-2001-0104755 A | | 11/2001 | |
| KR | 20010104755 | * | 11/2001 | ............... F01N 1/04 |
| KR | 100334274 | * | 10/2002 | ............... F01N 1/04 |
| KR | 1020040067487 | * | 7/2004 | ............... F01N 1/08 |
| KR | 1020040069146 | * | 8/2004 | ............... F01N 1/04 |
| KR | 10201000061952 | * | 6/2010 | ............... F01N 1/08 |

* cited by examiner

METHOD OF MANUFACTURING FILTER PIPE FOR VEHICLE AND FILTER PIPE FOR VEHICLE

CROSS-REFERENCE TO RELATED APPLICATION

This application claims priority to and the benefit of Korean Patent Application No. 10-2014-0131560 filed in the Korean Intellectual Property Office on Sep. 30, 2014, the entire contents of which are incorporated herein by reference.

TECHNICAL FIELD

The present invention relates to a method for manufacturing a filter pipe for vehicles which is used in a muffler for vehicles and a filter pipe for vehicles manufactured by the same.

BACKGROUND ART

An exhaust device which purifies and exhausts gas generated by the operation of an engine is generally provided in a vehicle.

The exhaust device may include an exhaust manifold which collects exhaust gas emitted from the respective cylinders of an engine, a catalytic converter which removes noxious components contained in exhaust gas, a muffler which reduces exhaust sound and an exhaust pipe which connects the exhaust manifold, the catalytic converter and the muffler together and through which exhaust gas passes.

Here, the muffler is a device which absorbs sound of exhaust gas emitted from an engine and is provided with a filter pipe therein.

The filter pipe is a tubular member which is connected to the exhaust pipe and passes linearly the inside of the muffler and is provided with a plurality of through holes on an outer circumference thereof so as to emit noise to the outside, and is formed such that an inner diameter of one side thereof is expanded.

In more detail, in the conventional manufacturing process of the filter pipe, a plurality of holes are formed in a mother material and then this mother material is cut in a predetermined size as a planar member. Subsequently, the cut planar member is bent to form a hollow cylindrical shape and then both end portions are adhered to one another by welding so as to form a tubular body with a uniform inner diameter. Finally, an expanded portion having different inner diameter is formed at one side of the tubular body by inserting an expanding mold having a diameter greater than the inner diameter of the tubular body into the tubular body or by inserting a jaw of a pipe-expanding device into one side of the tubular body and spreading to the outside That is, the enlarged portion is formed by a process of expanding the mother material in a radially outside direction, and it can have a greater size as the thickness of the mother material is thicker.

However, with the trend of weight reduction of a vehicle, a thickness of a part of a vehicle is gradually decreased.

Accordingly, the size of the enlarged portion is limited to a predetermined size due to the low expanding ratio, and it is impossible to insert an exhaust pipe into the expanded portion, so an additional shrinking process of the exhaust pipe is necessary, and this may cause an increase of exhaust pressure which may deteriorate the performance of an engine.

In addition, the expanding process of the filter pipe is performed after the welding process, so the welded portion may be damaged by the force applied during the expanding process.

DETAILED DESCRIPTION OF THE INVENTION

Technical Problem

The present invention is made in an effort to provide a method of manufacturing a filter pipe for vehicles which does not require a process of expanding the tube after welding.

Technical Solution

In an exemplary embodiment of the present invention, a method of manufacturing a filter pipe for vehicles which has an expanded tube portion with a different diameter at one side and is provided with a plurality of through holes formed along a circumferential direction includes: forming the plurality of through holes in a mother member; forming furrows at one end portion of the mother member; forming a planar member having the plurality of through holes and the furrows by a shearing process of the mother member; bending the planar member in a tubular shape and spreading the furrows to form an area where the furrows are formed in an expanded tube shape; and adhering both facing end portions of the planar member so as to form a body having the expanded tube portion at one side thereof.

The furrows may be semi-cylindrical protrusions which are protruded toward an upper side or a lower side of the planar member and form the expanded tube portion by the spreading while the planar member is bent, and may include a first spreading portion which is spread to form the expanded tube shape while the planar member is bent and a second spreading portion which is extended from the first spreading portion and is spread to form a slanted surface while the planar member is bent.

The forming of the furrows may include: determining the size of the expanded tube portion; and determining the size and the number of the furrows depending on the size of the expanded tube portion and forming the furrows at one end portion of the mother member.

The step of bending the planar member and spreading the furrows may include: disposing a core mold at a center portion of the planar member and bending both end portions in a width direction of the planar member by a predetermined angle along an outer surface of the core mold so as to form the planar member in an U shape; and bending both end portions in a width direction of the U-shaped planar member along an outer surface of the core mold so as to form the planar member in an O shape and spreading the furrows so as to form an area where the furrows are formed to the expanded tube shape.

The step of bending the planar member and spreading the furrows may further include bending the both end portions in the width direction of the planar member in a predetermined angle to form the planar member in a C shape, before the forming of the planar member in the U shape.

The core mold may include: a first supporting portion which is formed in a shape corresponding to an inner surface of a body where the expanded tube portion is not formed; and a second supporting portion which is extended from an end of the first supporting portion and is formed in a shape corresponding to an inner surface of the expanded tube portion.

A filter pipe for vehicles according to an embodiment of the present invention is manufactured by a method according to an embodiment of the present invention.

Advantageous Effects

According to the present invention, since the furrows are spread during the bending of the planar member so as to form an area where the furrows are formed in an expanded tube shape, a process of expanding the tube after welding using an expanding device can be eliminated, so manufacturing cost can be reduced and the welded portion can be prevented from being broken.

In addition, since the size and the number of the furrows are previously determined depending on the expanded size, the ration of the expansion can be increased, so the shrinking of the exhaust pipe which is inserted into the expanded tube portion can be eliminated, and thus sufficient flow passage can be obtained and the performance of an engine can be enhanced.

DETAILED DESCRIPTION OF THE EMBODIMENTS

Hereinafter, an embodiment of the present invention will be explained in detail with reference to the accompanying drawings.

Figure 1:
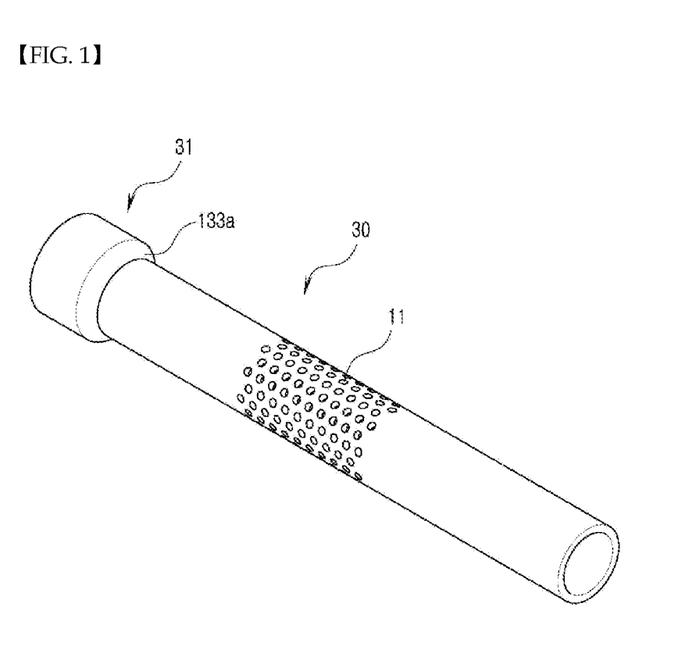
FIG. 1 shows a filter pipe for vehicles according to an embodiment of the present invention.
Figure 2:
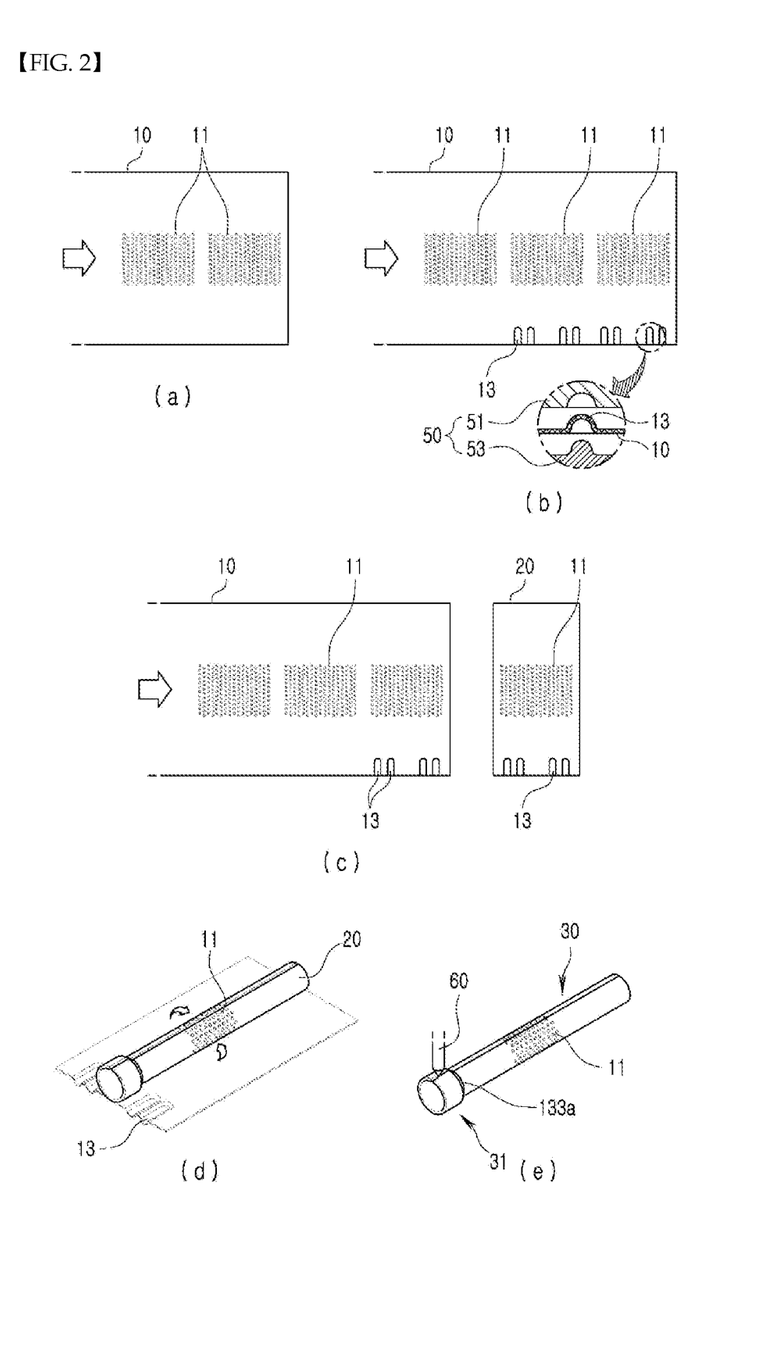
FIG. 2 shows schematic processes for manufacturing a filter pipe for vehicles according to an embodiment of the present invention.
Figure 3:
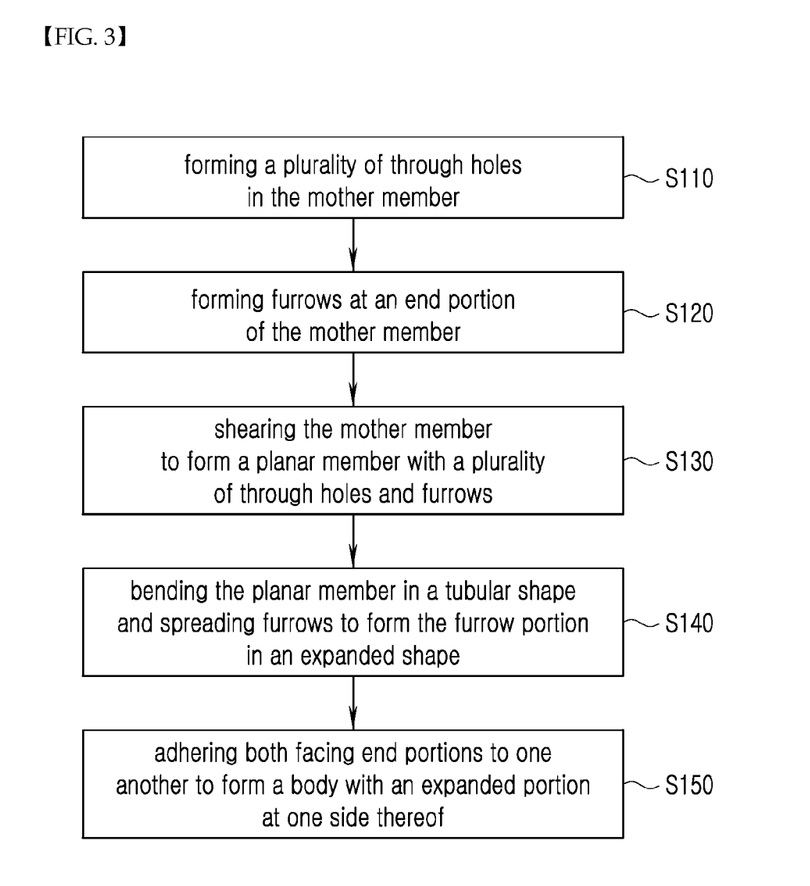
FIG. 3 is a flow chart showing a method of manufacturing a filter pipe for vehicles according to an embodiment of the present invention.
Figure 4:
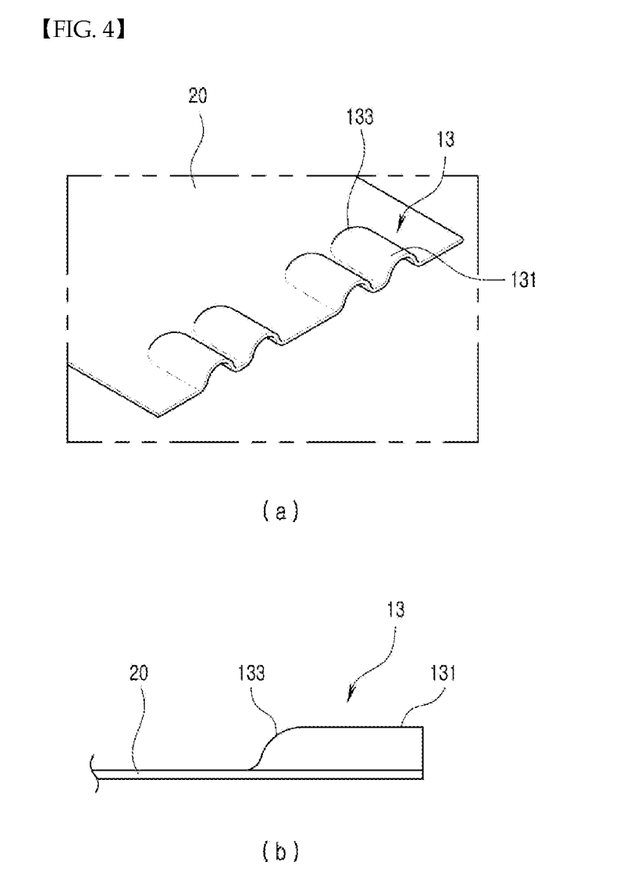
FIG. 4 shows furrows of a filter pipe for vehicles according to an embodiment of the present invention.
Figure 5:
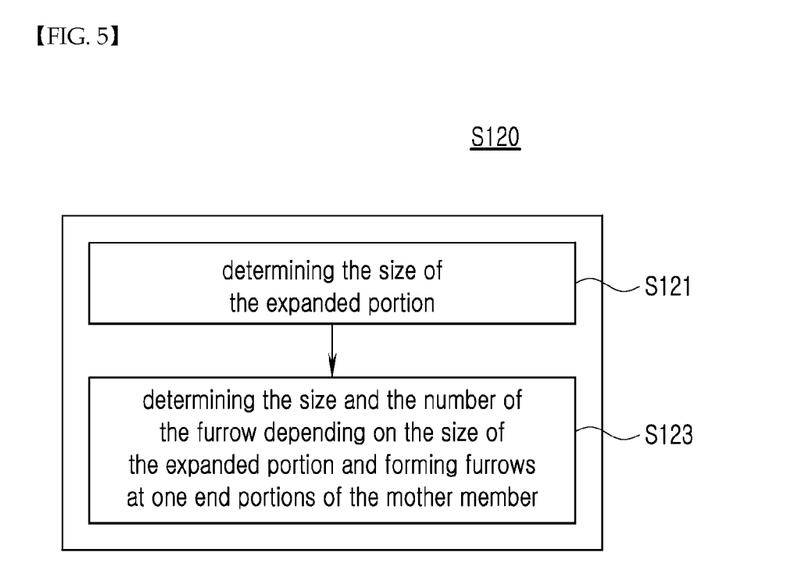
FIG. 5 is a flow chart of processes of forming furrows at one end portion of a mother material in a method of manufacturing a filter pipe for vehicles according to an embodiment of the present invention.

FIG. 1 shows a filter pipe for vehicles according to an embodiment of the present invention, FIG. 2 shows schematic processes for manufacturing a filter pipe for vehicles according to an embodiment of the present invention, FIG. 3 is a flow chart showing a method of manufacturing a filter pipe for vehicles according to an embodiment of the present invention, FIG. 4 shows furrows of a filter pipe for vehicles according to an embodiment of the present invention, and FIG. 5 is a flow chart of processes of forming furrows at one end portion of a mother material in a method of manufacturing a filter pipe for vehicles according to an embodiment of the present invention.

Referring to FIG. 1 and FIG. 3, a method of manufacturing a filter pipe for vehicles according to an embodiment of the present invention is a method for manufacturing a tubular filter pipe which has an expanded portion 31 having different diameter from the remained portion and a plurality of through holes 11 which are formed along a circumferential direction thereof, and includes a piercing process, a forming process, a cutting process, a bending process and a welding process.

First, the piercing process is a step S110 for forming a plurality of through holes 11 in a mother member 10, and as shown in FIG. 2, and a plurality of through holes 11 are formed with a constant distance therebetween along a longitudinal direction of the mother member 10 through repeated hole punching processes on the mother member 10 which is moved in one direction.

Exemplarily, the step S110 of forming the plurality of through holes 11 in the mother member 10 may form the plurality of through holes 11 with a constant gap therebetween along the longitudinal direction of the mother member 10 by setting the working period of the repeated hole punching depending on the size of a planar member 20.

The forming process is a step S120 of forming furrows at one end portion of the mother member 10 in which the through holes 11 are formed, and as shown in (b) of FIG. 2, if the through holes 11 are formed by the hole punching process on the mother member 10 which is being moved in one direction, the one end portion of the mother member 10 is pressurized by a forming mold 50 which is composed of an upper mold 51 and a lower mold 53 and is disposed at an area corresponding to the one end portion of the mother member 10, thereby forming the furrows 13.

Here, the furrows 13 may have a shape which is formed by the deformation by the pressurization of the forming mold 50 and may be easily spread during the bending of the planar member 20 which will be explained later.

Referring to FIG. 2 and FIG. 4, the furrows 13 may be a protrude of a semi-cylindrical shape which is protruded to an upper side or a lower side of the planar member 20 and will form the expanded tube portion 31 through the spreading during the bending of the planar member 20.

In more detail, the furrows 13 may include a first spreading portion 131 which is spread during the bending of the planar member 20 so as to form the expanded tube, and a second spreading portion 133 which is integrally form with the first spreading portion 131 by being extended form the first spreading portion 131 and is spread during the bending of the planar member 20 so as to form a slanted surface 133a.

That is, the furrows 13 is roundedly protruded as a whole so as not to form a boarder with a non-protruded surface of the planar member 20, thereby smoothly spreading during the bending of the planar member 20.

Meanwhile, referring to FIG. 5, the forming process, i.e., the step S120 of forming furrows 13 at one end portion of the mother member 10 may be divided into a step S121 of determining the expanded size and a step S1213 of determining the size and the number of the furrows 13 depending on the expanded size and forming the furrows 13 at one end portion of the mother member 10.

Accordingly, in a method of manufacturing a filter pipe for vehicles, after a plurality of through holes 11 are formed in the mother member 10, the expanded size of a portion where the expanded tube portion 31 is formed is determined, and based on this, the size and the number of the furrows 13 which are formed in the mother member 10 are determined and then the furrows 13 are formed.

The cutting process is a step S130 of shearing the mother member 10 having the through holes 11 and the furrows 13 in a predetermined size so as to form the planar member 20 having the plurality of through holes 11 and the furrows 13, and as shown in (c) of FIG. 2, if the through holes 11 and the furrows 13 are formed in the mother member 10 which is being moved in one direction, the mother member 10 is cut to a predetermined size and one planar member 20 having the through holes 11 and the furrows 13 is formed.

Subsequently, the bending process and the welding process will be explained.

Figure 6:
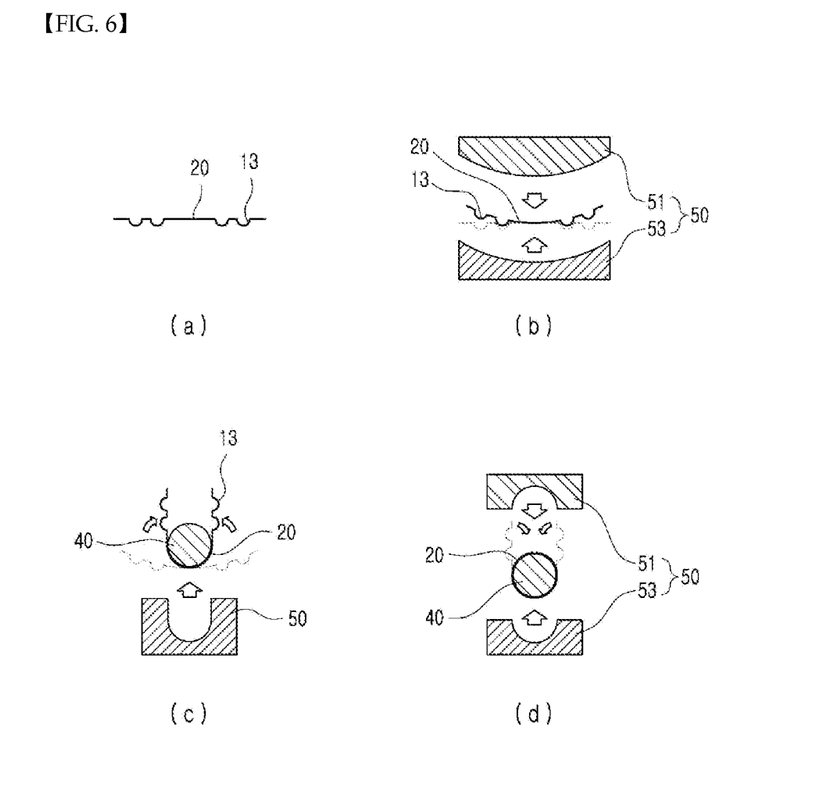
FIG. 6 shows schematic processes of bending a planar member in a tubular shape and at the same time spreading furrows to change furrow portions into an expanded shape in a method of manufacturing a filter pipe for vehicles according to an embodiment of the present invention.
Figure 7:
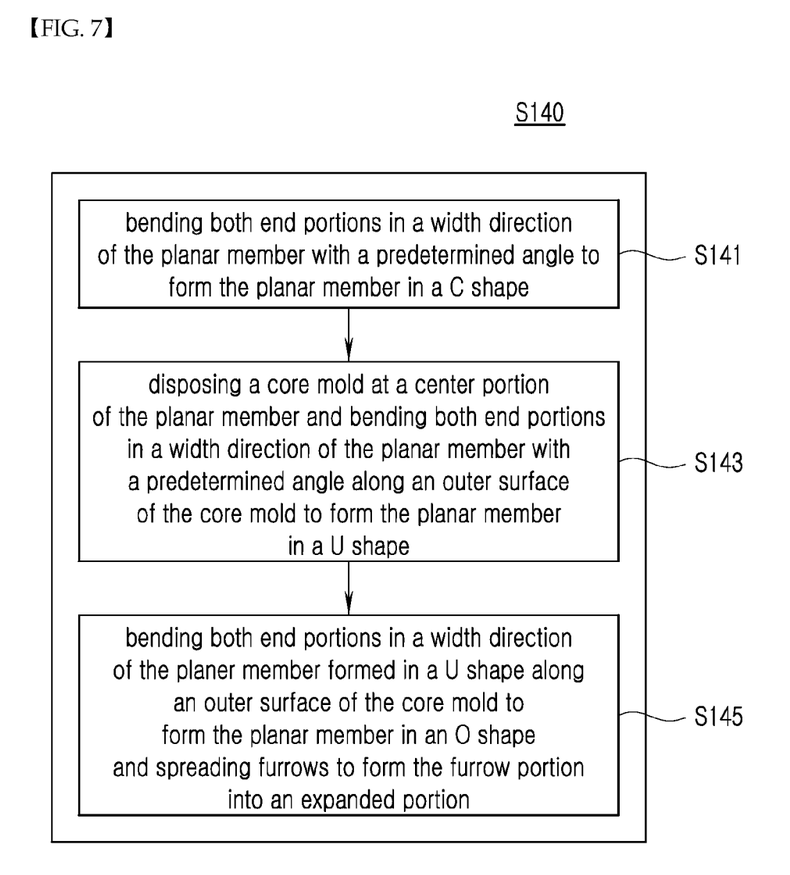
FIG. 7 is a flow chart of processes of forming furrows at one end portion of a mother material in a method of manufacturing a filter pipe for vehicles according to an embodiment of the present invention.
Figure 8:
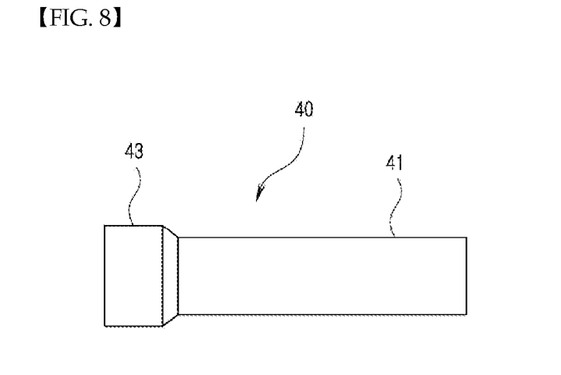
FIG. 8 shows a core mold which is disposed at a center of a planar member during the process of bending the planar member to support the planar member.

FIG. 6 shows schematic processes of bending a planar member in a tubular shape and at the same time spreading furrows to change furrow portions into an expanded shape in a method of manufacturing a filter pipe for vehicles according to an embodiment of the present invention, FIG. 7 is a flow chart of processes of forming furrows at one end portion of a mother material in a method of manufacturing a filter pipe for vehicles according to an embodiment of the present invention, and FIG. 8 shows a core mold which is disposed at a center of a planar member during the process of bending the planar member to support the planar member.

The bending process is a step S140 of bending the planar member 20 to form in the tubular shape and spreading the furrows 13 of the planar member 20 so as to form the area where the furrows 13 are formed into an expanded tube shape, and as shown in (d) of FIG. 2 and FIG. 6, the planar member 20 is pressurized from the outside inwardly so as to be bend in a circular tube shape and at this time the furrows 13 is spread so as to form the expanded tube shape.

At this time, the planar member 20 may be changed from the planar shape to the circular tube shape through sequential bending processes.

Referring to FIG. 6 and FIG. 7, the step S140 of being the planar member 20 so as to form in the tubular shape and spreading the furrows 13 so as to form the area of the furrows 13 into the expanded tube shape may include a step S143 of disposing a core mold 40 at a center portion of the planar member 20 and bending both end portions in a width direction of the planar member 20 along an outer surface of the core mold 40 so as to form the planar member 20 into an U shape, and a step S145 of bending both end portions in the width direction of the planar member 20 which is formed in the U shape along an outer surface of the core mold 40 so as to form the planar member 20 into an O shape and at the same time spreading the furrows 13 so as to form the area where the furrows 13 are formed into the expanded tube shape.

Further, the step S140 of being the planar member 20 so as to form in the tubular shape and spreading the furrows 13 so as to form the area of the furrows 13 into the expanded tube shape may further include a step S141 of bending both end portions of the planar member 20 in a predetermined angle before forming the planar member 20 into the U shape.

That is, in a method of manufacturing a filter pipe for vehicles, if the planar member 20 having the furrows 13 is formed from the mother member 10, the planar member 20 is formed in a C shape after disposing the forming mold 50 at the upper side and the lower side of the planar member 20, and subsequently after the core mold 40 is disposed at the upper center portion of the planar member 20 which has been formed in the C shape and the forming mold 50 is disposed at the lower side of the planar member 20, the planar member 20 of the C shape is formed to the U shape. Finally, after the forming mold 50 are disposed at an upper side and a lower side of the planar member 20 which has been formed in the U shape, the planar member 20 which has been formed in the U shape is pressurized so as to form the U-shaped planar member 20 into the O shape.

Accordingly, in the process of bending the U-shaped planar member 20 to change into the O shape, i.e., the process that the area where the furrows 13 are formed is pressurized so as to be bent along the outer circumferential surface of the core mold 40, the furrows 13 which are formed at one end portion of the planar member 20 is pressurized against the core mold 40 so as to be spread, so the area where the furrows 13 are formed is enlarged so as to form the expanded tube shape.

Here, the core mold 40 may be formed to have a shape which causes one end portion of the planar member 20 to be formed to the expanded tube shape when the planar member 20 is being bent in a tubular shape.

Referring to FIG. 8, the core mold 40 may include a first supporting portion 41 which is formed with a shape corresponding to an inner surface of the body 30 in which the expanded tube portion 31 is not formed and a second supporting portion 43 which is extended from an end of the first supporting portion 41 and is formed with a shape corresponding to an inner surface of the expanded tube portion 31.

The welding process is a final process of a method for manufacturing a filter pipe and is a step S150 of adhering both facing end portions of the planar member 20 so as to form a body 30 having the expanded tube portion 31 at one side thereof, and as shown in (e) of FIG. 2, if the planar member 20 is bent in a shape of a circular tube shape having an expanded tube shape at one end thereof, the both end portions contacting one another is welded along a longitudinal direction of the planar member 20 using a welding device 60, so the tubular body 30 having the expanded tube portion 31 at one side thereof is formed.

As such, according to the present invention, the furrows 13 are formed on the planar member 20 and the furrows 13 are spread when the planar member 20 is bent so as to form in the expanded tube shape, so after the tubular body 30 is formed by the welding, so a separate expanding process using an expanding device can be eliminated, and thus the manufacturing cost can be reduced and the breaking of the welded portion can be prevented.

In addition, since the planar member 20 is formed after the size and the number of the furrows 13 are previously determined, the ration of the expansion can be increased, so the shrinking process of the exhaust pipe which is inserted thereinto can be eliminated, and thus sufficient flow passage can be obtained so as to enhance an efficiency of an engine.

Hereinafter, a filter pipe for vehicles which is manufactured by a method according to an embodiment of the present invention will be explained.

The same reference numeral will be used for the same part which has been explained in the above description, and the repeated description will be omitted.

Referring to FIG. 1, a filter pipe is installed within a muffler (not shown), and an exhaust pipe is connected to one side thereof. The filter pipe is a body 30 which is provided with a plurality of through holes 11 on an outer surface along a circumferential direction and emits sound to the outside, and is provided with the expanded tube portion 31 which is expanded so as to have an enlarged inner diameter for the coupling with the exhaust pipe.

The expanded tube portion 31 is extended from an end of the body 30 in which the through holes 11 are formed and has an expanded tube portion and the slanted surface 133a connecting the expanded tube portion and the body 30 together.

Exemplarily, an inner diameter of the expanded tube portion 31 may be equal to the outer diameter of the exhaust pipe.

In addition, the filter pipe may be formed in a uniform thickness as a whole.

In detail, the filter pipe may be formed by the piercing process, a forming process, a cutting process, a bending process and a welding process. That is, the filter pipe is formed in such a way in which an expanded tube portion is formed in the bending process in which the planar member 20 is bent, without the separate expansion process, so when the body 30 is formed after the welding, a uniform thickness can be maintained.

Exemplarily, the filter pipe may be made of various materials such as aluminum, stainless steel or the like as well as steel plate.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of manufacturing a filter pipe for a vehicle, comprising:
    forming the plurality of through holes in a mother member;
    forming furrows at one end portion of the mother member;
    forming a planar member having the plurality of through holes and the furrows by a shearing process of the mother member;
    bending the planar member into a tubular shape;
    while bending the planar member into the tubular shape, spreading the furrows to form an area at the one end portion having an expanded tube shape; and
    adhering both facing end portions of the planar member so as to form a body of the filter pipe having the expanded tube portion, having a diameter larger than the rest of the filter pipe, at the one side thereof.

2. The method of claim 1, wherein the furrows are semi-cylindrical protrusions which are protruded toward an upper side or a lower side of the planar member and form the expanded tube portion by the spreading while the planar member is bent, and comprises a first spreading portion which is spread to form the expanded tube shape while the planar member is bent and a second spreading portion which is extended from the first spreading portion and is spread to form a slanted surface while the planar member is bent.

3. The method of claim 1, wherein the forming of the furrows comprises:
    determining the size of the expanded tube portion; and
    determining the size and the number of the furrows depending on the size of the expanded tube portion and forming the furrows at one end portion of the mother member.

4. The method of claim 1, wherein the step of bending the planar member and spreading the furrows comprises:
    disposing a core mold at a center portion of the planar member and bending both end portions in a width direction of the planar member by a predetermined angle along an outer surface of the core mold so as to form the planar member in an U shape; and
    bending both end portions in a width direction of the U-shaped planar member along an outer surface of the core mold so as to form the planar member in an O shape and spreading the furrows so as to form an area where the furrows are formed to the expanded tube shape.

5. The method of claim 4, wherein the step of bending the planar member and spreading the furrows further comprises bending the both end portions in the width direction of the planar member in a predetermined angle to form the planar member in a C shape, before the forming of the planar member in the U shape.

6. The method of claim 4, wherein the core mold comprises:
    a first supporting portion which is formed in a shape corresponding to an inner surface of a body where the expanded tube portion is not formed; and
    a second supporting portion which is extended from an end of the first supporting portion and is formed in a shape corresponding to an inner surface of the expanded tube portion.

7. A filter pipe for vehicles which is manufactured by a method of claim 1.

* * * * *